Patented June 9, 1936

2,043,559

UNITED STATES PATENT OFFICE 2,043,559

PRODUCTION OF ENAMELWARE

Jacob E. Rosenberg, Pittsburgh, Pa., assignor to The O. Hommel Company, a corporation of Pennsylvania No Drawing. Application June 3, 1935, Serial No. 24,705

17 Claims. (Cl. 91—73)

This invention relates to improvements in the production of glass-coated metal articles; and, while of general applicability, finds practical value in producing enamel ware—that is to say, articles and utensils of iron and steel, coated with glass. The object in view is an article of the nature indicated whose coating, ordinarily white or colorless, is bonded securely to the underlying metal. This application is, in part, a continuation of an application filed by me January 10, 1935, Serial No. 1,213.

I have discovered that if I employ as the coating material a glass that, when brought to molten condition upon the surface of the iron or steel article, reacts with the iron; and, specifically, a glass that in such reaction forms iron oxide and takes iron oxide into solution; and if, additionally, the glass, when so brought to molten condition upon the surface of the iron or steel article, carries in solution and in measured quantity a compound of a metal less electropositive than iron, the adhesion of the enamel coating to the coated body may be greatly improved. In the firing of the article, when the applied coating has been brought to molten condition, two particular reactions become effective: one of them is the reaction already indicated—the etching of the surface of the iron or steel article by the molten glass. In this reaction minute quantities of iron of the surface of the article are oxidized. This reaction is attended by a solution in the molten glass of the iron oxide so formed. This etching action I shall in the ensuing claims designate erosion. The other reaction is an electrodeposition of the electropositive metal alluded to, upon the surface of the iron or steel article. The etching roughens minutely the surface of iron or steel upon which the coating of glass lies; the incipient electrodeposition consists in a laying down of minute and isolated flakes of the less electropositive metal upon the surface of the iron or steel article. This laying down of isolated flakes interrupts irregularly and discontinuously the progress of the etching action described. The effect is that of an irregular, though still minute, pitting of the surface of the iron or steel article. Into the deeper and more irregular pits so formed the molten glass penetrates, so that on cooling the rigid body of glass is interlocked with the rigid body of iron or steel, with an intimacy and a security of union not otherwise to be obtained. It is to be understood that these reactions are minute and localized; so much so that the iron oxide that goes into solution in the glass will not ordinarily penetrate the layer of molten glass to its exposed surface, and will not ordinarily effect appreciable discoloration. Of course, if such discoloration be not objectionable, precision in the practice of the invention may be so far relieved that such penetration of the dissolved iron oxide may reach the outer surface of the layer of glass. The quantity of the compound of the less electropositive metal that is included in the layer of glass when fused upon the surface of the article will not be so great as to allow a continuous plating of the less electropositive metal to be laid upon the surface of the iron or steel article, and, since the electroplating action will be more vigorous, the more widely the particular metal chosen may be remote from iron in the electromotive series, it follows that the more remote the metal chosen, the smaller its quantity will be concerning the glass composition it need only be added that, at variance with usual practice respecting ground coats, its coefficient of thermal expansion is preferably closely identical with that of iron, and in consequence the union effected is more secure against weakening by temperature changes.

The glass employed may be such as the art knows. For example (though not by way of limitation), it may be compounded of the materials feldspar, silica, borax, cryolite, fluorspar, niter, and soda, selected and proportioned as is usual; and to the other ingredients an oxidizing agent will be added. Such agents are found in the antimonates, the uranates, the manganates, and the vanadates of the alkali and alkaline—earth metals—typically sodium antimonate. The manganates, obviously, will be employed only in cases in which the characteristic color afforded by manganese oxide is not objectionable. A typical formula is—

| | Parts |
|---|---|
| Feldspar | 30 |
| Silica | 16.5 |
| Borax | 27 |
| Cryolite | 16.5 |
| Fluorspar | 3.5 |
| Niter | 5 |
| Sodium antimonate | 17 |

These ingredients are smelted in usual manner; the resulting glass is ground; it may then be worked with water and clay into a slip, and applied to the surface of the article of iron or steel that is to be enameled.

The compound of the less electropositive metal employed will be such as is commercially available. In ordinary ground coats cobalt alone has been added to an otherwise non-bonding glass;

and does effect a bond, when added in quantity sufficient, both to oxidize the iron, and (plating out) to give a discontinuous deposit. In order to reduce the quantity of cobalt (which is expensive) smaller amounts are used (approximately 0.5%), in which case manganese dioxide, in amounts up to 2%, is also added. This plays the role of the oxidizing agent. According to this invention, the oxidizing role is played by the antimonate, and the metal that plates out may be any of those less electropositive than iron; and, if cobalt, the quantity must be not less than substantially 0.2%.

To be effective, antimony in the pentavalent form and in sufficient quantity must be present in the melted glass. This form is a powerful oxidizing agent. To insure its presence in the glass, it is desirable to incorporate it as a salt of the pentavalent oxide. This may be added either to the smelt or in the mill. While it is possible to use in the smelt lower oxides of antimony and niter, this will hardly insure sufficient oxidation of the antimony. It is practically necessary, then, in the practice of the invention, to add antimonate as such. Furthermore, antimony pentoxide is recognized to be the form in which antimony is present, when it serves as an opacifier. And, fortunately, in the practice of this invention, it serves both purposes—to oxidize and to opacify. If such coloration be not objectionable, cobalt may be used; otherwise, in the practice of the invention, I resort to metals less electropositive than those of the iron group. I have employed with success compounds of the metals copper, silver, gold, and bismuth, all of which are not merely lower than iron, but are relatively remote in the series from iron. Other metals, obviously serviceable, but for practical reasons not available, are platinum, iridium, rhodium, thallium, and osmium. Each particular metal will be employed in a compound soluble in glass, and for particular metals I specify these practically available compounds—copper carbonate, silver chloride, potassium gold chloride, and bismuth oxychloride.

The quantity employed will be limited within a small maximum figure that, as has been said, varies. The permissible maximum is relatively large in the case of a metal that stands near to iron in the electromotive series, and is relatively small in the case of a remotely standing metal. Specifically, in the case of copper carbonate, I have found that the addition should not exceed 0.25% of the weight of the glass to which the addition is made; but in the case of potassium gold chloride, the addition should not exceed 0.01%. The quantity may in any case be less than the maximum figure given or indicated.

The addition of the compound of less electropositive metal may be made at any convenient point in the preparation of the glass or of the slip. It may be prepared as a slurry and applied first to the surface of the article to be coated, and upon such slurry in turn the slip may be spread. Conveniently, however, I add the metal compound as a mill addition, when grinding the previously smelted glass, and so include it in the slip. In either case, manifestly, when the coated article is fired, the metal compound is present in solution, to accomplish the ends described.

In no other respect does the practice of my invention impose limitations upon the ordinary procedure in enamel-ware making. The slip is prepared, the coating is applied, and the coated article fired in usual manner. In the firing, when the coating of glass fuses the two reactions described above set in, with the consequence and effect that the molten glass penetrates a roughened metal surface, and on cooling the rigid coat is mechanically interlocked upon such surface with enhanced security. The coat of enamel has a coefficient of thermal expansion approximately that of iron, and is on that account also best suited to service conditions.

I claim as my invention:

1. The method herein described of forming upon and bonding securely to the surface of an article of iron a coating of glass free from blue cobalt coloration which comprises fusing immediately upon the surface of said iron a layer of glass which in fused condition contains an iron erosive agent in addition to the usual glass components, which agent makes the glass in fused condition erosive of said iron, and also a compound of a metal less electro-positive than cobalt and capable of being replaced by iron in said compound, said compound being present in an amount sufficient to plate its metal upon the surface of said iron but not sufficient to form a continuous plating, whereby said iron is discontinuously protected from erosion by said glass and said glass pits said iron and interlocks therewith upon cooling.

2. The method herein described of forming upon and bonding securely to the surface of an article of iron a coating of glass free from blue cobalt coloration which comprises fusing immediately upon the surface of said iron a layer of glass which contains an iron erosive agent selected from the group consisting of the antimonates, uranates, manganates, and vanadates of the alkali and alkaline earth metals, which agent makes the glass in fused condition erosive of said iron, and also a compound of a metal less electro-positive than cobalt and capable of being replaced by iron in said compound, said compound being present in an amount sufficient to plate its metal upon the surface of said iron but not sufficient to form a continuous plating, whereby said iron is discontinuously protected from erosion by said glass and said glass pits said iron and interlocks therewith upon cooling.

3. The method herein described of forming upon and bonding securely to the surface of an article of iron a layer of glass suitable for forming a white or colorless coating which comprises fusing immediately upon the surface of said iron a layer of glass which in fused condition contains an iron erosive agent in addition to the usual glass forming components, which agent does not color the glass and which makes the glass in fused condition erosive of said iron, and also a compound of a metal less electro-positive than cobalt and capable of being replaced by iron in said compound, said compound being present in an amount sufficient to plate its metal upon the surface of said iron but not sufficient to form a continuous plating, whereby said iron is discontinuously protected from erosion by said glass and said glass pits said iron and interlocks therewith upon cooling.

4. The method herein described of forming upon and bonding securely to the surface of an article of iron a layer of glass suitable for forming a white or colorless coating which comprises fusing immediately upon the surface of said iron a layer of glass which in fused condition contains antimony pentoxide in addition to the usual glass forming components and also a compound of a metal less electro-positive than cobalt and capable of being replaced by iron in said compound, said compound being present in an amount sufficient to plate its metal upon the surface of said iron but not sufficient to form a continuous plating, whereby said iron is discontinuously protected from erosion by said glass and said glass pits said iron and interlocks therewith upon cooling.

5. The method herein described of forming upon and bonding securely to the surface of an article of iron a layer of glass suitable for forming a white or colorless coating which comprises fusing immediately upon the surface of said iron a layer of glass which in fused condition contains antimony pentoxide in addition to the usual glass forming components, and a compound of copper in which the copper is capable of being replaced by iron in said compound, the amount of copper in said glass not exceeding that in 0.25% of copper carbonate.

6. The method herein described of forming upon and bonding securely to the surface of an article of iron a layer of glass suitable for forming a white or colorless coating which comprises fusing immediately upon the surface of said iron a layer of glass which in fused condition contains antimony pentoxide in addition to the usual glass forming components and a compound of silver in which the silver is capable of being replaced by iron in said compound, said silver compound being present in an amount sufficient to plate silver upon the surface of said iron but not sufficient to form a continuous plating, whereby said iron is discontinuously protected from erosion by said glass and said glass pits said iron and interlocks therewith upon cooling.

7. The method herein described of forming upon and bonding securely to the surface of an article of iron a layer of glass suitable for forming a white or colorless coating which comprises fusing immediately upon the surface of said iron a layer of glass which in fused condition contains antimony pentoxide in addition to the usual glass forming components and also a compound of a metal less electro-positive than cobalt and capable of being replaced by iron in said compound, the metal of said compound being present in an amount less than substantially 0.2% dependent upon its position in the electro-motive series relative to iron, said amount diminishing the more remote said metal is from iron in said series.

8. The method herein described of forming upon and bonding securely to the surface of an article of iron a coating of glass free from blue cobalt coloration which comprises fusing immediately upon the surface of said iron a layer of glass which in fused condition contains an iron erosive agent in addition to the usual glass forming components, which agent makes the glass in fused condition erosive of said iron, and also a compound of a metal less electro-positive than cobalt and capable of being replaced by iron in said compound, the metal of said compound being present in an amount less than substantially 0.2% dependent upon the position of said metal relative to iron in the electro-motive series, said amount diminishing the more remote said metal is from iron in said series.

9. An article of manufacture which comprises a layer of glass securely bonded by fusion to iron, said layer being free of blue cobalt coloration and containing an iron erosive agent in addition to the usual glass forming components, said iron having a discontinuous plating of a metal less electro-positive than cobalt and said glass extending into pits in said iron in unplated areas thereof.

10. An article of manufacture which comprises a layer of glass securely bonded by fusion to iron, said layer being free of blue cobalt coloration and containing an iron erosive agent in addition to the usual glass forming components and a compound of a metal less electro-positive than cobalt, the metal of said compound being present in an amount less than substantially 0.2% dependent upon the position of said metal relative to iron in the electro-motive series, said amount diminishing the more remote said metal is from iron in said series.

11. An article of manufacture which comprises a layer of glass securely bonded by fusion to iron, said layer being free of blue cobalt coloration and containing antimony pentoxide and a compound of a metal less electro-positive than cobalt, the metal of said compound being present in an amount less than substantially 0.2% depending upon the position of said metal relative to iron in the electro-motive series, said amount diminishing the more remote said metal is from iron in said series.

12. A frit for enamel ware, suitable for forming upon and bonding securely to the surface of an article of iron a coating of glass free from blue cobalt coloration, containing, in addition to the usual glass components, an iron-erosive agent, and also a compound of a metal less electropositive than cobalt and capable of being replaced by iron in such compound, said compound being present in an amount sufficient to plate its metal upon the surface of such article of iron, but not sufficient to form a continuous plating, whereby in the firing operation the iron is discontinuously protected from erosion by the glass and the glass pits the iron and in the ensuing cooling interlocks therewith.

13. A frit for enamel ware, suitable for forming upon and bonding securely to the surface of an article of iron a coating of glass free from blue cobalt coloration, containing, in addition to the usual glass-forming components, an iron-erosive agent and also a compound of copper in which the copper is capable of being replaced by iron, the amount of copper in said glass not exceeding that in 0.25% of copper carbonate.

14. A frit for enamel ware, suitable for forming upon and bonding securely to the surface of an article of iron a coating of glass free from blue cobalt coloration, containing, in addition to the usual glass-forming components, an iron-erosive ingredient selected from a group that consists of the antimonates, the uranates, the manganates, and the vanadates of the alkali and alkaline-earth metals, and also a compound of a metal less electropositive than cobalt and capable of being replaced by iron in such compound, said compound being present in an amount sufficient to plate its metal upon the surface of such article of iron but not sufficient to form a continuous plating, whereby in the firing operation the iron is discontinuously protected from erosion by the glass and the glass pits the iron and in the ensuing cooling interlocks therewith.

15. A frit for enamel ware, suitable for forming upon and bonding securely to the surface of an article of iron a coating of glass free from blue cobalt coloration, containing, in addition to the usual glass-forming components, an iron-erosive ingredient selected from a group that consists of the antimonates, the uranates, the manganates, and the vanadates of the alkali and the alkaline-earth metals, and also copper carbonate in an amount sufficient to plate copper upon the surface of such article of iron, but not sufficient to form a continuous plating, whereby in the firing operation the iron is discontinuously protected from erosion by the glass and the glass pits the iron and in the ensuing cooling interlocks therewith.

16. A frit for enamel ware, suitable for forming upon and bonding securely to the surface of an article of iron a coating of glass free from blue cobalt coloration, containing, in addition to the usual glass-forming components, an iron-erosive agent, and also a compound of silver in which silver is capable of being replaced by iron, in an amount sufficient to plate silver upon the surface of such article of iron, but not sufficient to form a continuous plating, whereby in the firing operation the iron is discontinuously protected from erosion and the glass pits the iron and in the ensuing cooling interlocks therewith.

17. A frit for enamel ware, suitable for forming upon and bonding securely to the surface of an article of iron a coating of glass free from blue cobalt coloration, containing, in addition to the usual glass-forming components, antimony pentoxide and also a compound of a metal less electropositive than cobalt, the metal of such compound being present in an amount less than substantially 0.2%, dependent upon the position of such metal relatively to iron in the electromotive series, the amount diminishing the more remote the metal from iron in the series.

JACOB E. ROSENBERG.